(12) United States Patent
Bi et al.

(10) Patent No.: US 7,706,311 B2
(45) Date of Patent: Apr. 27, 2010

(54) EXPANDING CELL RADIUS IN A WIRELESS COMMUNICATION SYSTEM

(75) Inventors: Qi Bi, Morris Plains, NJ (US); Terry Si-Fong Cheng, Randolph, NJ (US); Frances Jiang, Whippany, NJ (US); Yang Yang, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1148 days.

(21) Appl. No.: 11/298,554

(22) Filed: Dec. 9, 2005

(65) Prior Publication Data

US 2007/0133445 A1   Jun. 14, 2007

(51) Int. Cl.
H04B 7/00 (2006.01)
(52) U.S. Cl. .................. 370/310; 370/328; 370/347
(58) Field of Classification Search .......... 370/310, 370/328, 347
See application file for complete search history.

(56) References Cited

U.S. PATENT DOCUMENTS

| | | | | |
|---|---|---|---|---|
| 5,432,788 A | * | 7/1995 | Ozveren | 370/458 |
| 5,864,839 A | * | 1/1999 | Bourgoin | 707/1 |
| 6,850,499 B2 | * | 2/2005 | Wheatley et al. | 370/328 |
| 7,079,550 B2 | * | 7/2006 | Padovani et al. | 370/468 |
| 7,184,426 B2 | * | 2/2007 | Padovani et al. | 370/347 |
| 2002/0131376 A1 | * | 9/2002 | Wheatley et al. | 370/328 |
| 2003/0142656 A1 | * | 7/2003 | Padovani et al. | 370/347 |
| 2004/0233867 A1 | * | 11/2004 | Wheatley et al. | 370/328 |
| 2005/0276220 A1 | * | 12/2005 | Kokko | 370/230 |

* cited by examiner

Primary Examiner—Joseph H Feild
Assistant Examiner—Huy D Nguyen
(74) Attorney, Agent, or Firm—Williams, Morgan & Amerson PC

(57) ABSTRACT

The present invention provides a method and an apparatus for a wireless communication between a base station and at least one mobile station. The method includes receiving a request for a data rate from the mobile station on a reverse link channel to the base station. The method further includes, in response to the request, skipping a first slot after a delay for a portion of a slot on a forward link transmission before transmitting a data packet in a second slot. By beginning the forward link transmission at the start of the second slot, for example, a software module may cause the base station to skip a slot immediately after the half slot delay. This additional delay of one slot or a portion of the slot may expand radius of a cell for a wireless communication between the base station and the mobile station in a relatively high-speed wireless data network.

15 Claims, 6 Drawing Sheets

EXPANDING CELL RADIUS IN A WIRELESS COMMUNICATION SYSTEM

FIELD OF THE INVENTION

This invention relates generally to telecommunications, and more particularly, to wireless communications.

DESCRIPTION OF THE RELATED ART

Wireless communications systems or mobile telecommunication systems typically provide different types of services to different users or subscribers of wireless communication devices. The wireless communication devices may be mobile or fixed units and situated within a geographic region across one or more wireless networks. The users or subscribers of wireless units or communication devices, such as mobile stations (MSs) or access terminals or user equipment may constantly move within (and outside) particular wireless networks. A wireless unit may encompass additional features and applications than typically available on a conventional cellular phone. Examples of different features and applications include e-mail service, Internet access, audio-video interfaces for music and media content streaming.

A wireless communications system generally includes one or more base stations (BSs) that can establish wireless communications links with wireless units. Each wireless unit has an active set, which comprises a set of base stations with which it may communicate. Base stations may also be referred to as node-Bs or access networks. To form the wireless communications link between a wireless unit and a base station, the wireless unit accesses a list of available channels (or carriers) broadcast by the base station. To this end, a wireless communications system, such as a spread spectrum wireless communications system, may allow multiple users to transmit simultaneously within the same wideband radio channel, enabling a frequency re-use based on a spread spectrum technique.

In a high speed wireless data network, a mobile station provides feedback and data rate requests on a reverse link channel to efficiently utilize the forward link transmission bandwidth. In an Evolved Data Optimized (EVDO) system, for example, the mobile station sends a request for a data rate in every 1.67 ms slot via the Data Request Channel (DRC). To synchronize and simplify decoding, the EVDO air interface standard requires that if a base station sends any data packet to the mobile station, the base station must send that data packet using the exact same data rate as that requested by the mobile station over the DRC. Additionally, the base station must send the data packet in the next slot after the DRC has been decoded.

However, such a timing restriction imposes a hard limit on the radius of a cell because all the delays within a wireless communication system must meet the requirement that the base station must send the packet to the mobile in the next slot. The cell radius refers to an allowed delay over an air interface, i.e., the total delay budget without the delay from a receive antenna to a transmit antenna at a base station. The total delay budget includes the time it takes to decode the DRC, send a DRC value from a reverse link modem to a forward link modem, schedule a user among all the active users in a sector, encode a forward link packet for the selected user except a transmission delay within the base station from a radio to an antenna connector.

In addition, the EVDO standard further restricts that the base station decode the DRC only at the end of the DRC length slot. For example, if the DRC length=2, the DRC decoder determines the DRC value after 2 slots. Although this requirement allows the mobile station to use relatively lower power when using larger DRC length, so that the base station gets the combining gain, this requirement forces the base station to only have less than half a slot turn around time to start transmitting if the base station has selected a particular user, regardless of the DRC length.

Referring to FIG. 3, a conventional forward link transmission immediately starts after a half slot at the end of a data rate channel (DRC) length on the reverse link transmission. For example, a DRC length of 4 is shown, for which a decoder may determine a DRC value after 4 slots. In other words, the EVDO standard imposes a restriction over a base station to decode the DRC only at the end of the DRC length slot(s), limiting the radius of a cell. Accordingly, a larger cell having an expanded radius may not be supported by the forward link transmission and the reverse link DRC transmission consistent with the EVDO standard requirements. For example, due to the above set forth restrictions, the cell radius is limited and is unable to support a boomer cell (larger than 32 miles) configuration.

One approach may increase the cell radius, i.e., in a situation when it takes longer to receive the mobile station's DRC, (with a bigger cell radius, air interface propagation time is longer) the base station is still able to send out the data packet to a user in the next DRC slot. However, the base station performs an early decoding of the DRC, i.e., without waiting until the end of DRC length. To do such an early decoding successfully, the DRC power is increased, which in turn increases reverse link interference. Since the forward link capacity of the EVDO system result in a significantly high reverse link capacity sacrifice, any further increase in the reverse link interference may result in more reduction in the overall system capacity.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one illustrative embodiment of the present invention, a method is provided for a wireless communication between a base station and at least one mobile station. The method includes receiving a request for a data rate from the at least one mobile station on a reverse link channel to the base station. The method further includes, in response to the request, skipping a first slot after a delay for a portion of a slot on a forward link transmission before transmitting a data packet in a second slot.

In another illustrative embodiment of the present invention, an article comprising a computer readable storage medium storing instructions that, when executed cause a base station to receive a request for a data rate from the at least one mobile station on a reverse link channel to the base station and skip a first slot after a delay for a portion of a slot on a forward link transmission in response to the request before transmitting a data packet in a second slot.

BRIEF DESCRIPTION OF THE DRAWINGS

The invention may be understood by reference to the following description taken in conjunction with the accompanying drawings, in which like reference numerals identify like elements, and in which.

Figure 1:
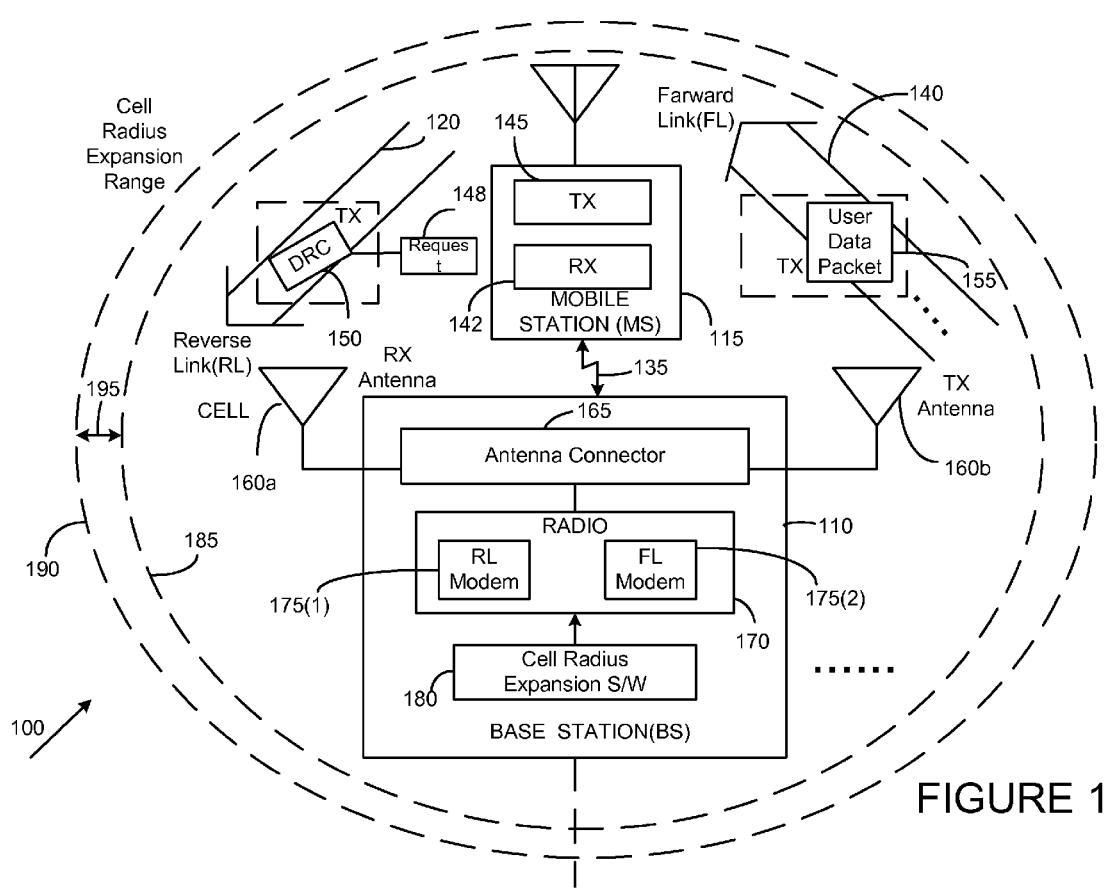
FIG. 1 schematically depicts a wireless communication system that may expand radius of a cell for a wireless communication between a base station and at least one mobile station in a high-speed wireless data network according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for expanding radius of a cell for a wireless communication between a base station (BS) and at least one mobile station (MS) associated with a high-speed wireless data network. The base station may obtain data rates for a forward link transmission based on the feedback on a reverse link from the mobile station. In a wireless communication system, the base station may start transmission to the mobile station after a desired delay, i.e., in a subsequent period instead of an available delay for only half a slot, such as a time slot of a fixed duration based on a particular standard. The base station may comprise a software module that delays the scheduling of a request for a data rate. In response to the request, the software module may skip a first slot after a half slot delay on the forward link transmission before transmitting a data packet in a second slot. That is, the base station may schedule the forward link transmission of a user to start to the mobile station in the second slot. By beginning the forward link transmission at the start of the second slot, the software module may cause the base station to skip a slot immediately after the half slot delay. This additional delay of one slot or a portion of the slot may expand radius of a cell for a wireless communication between the base station and the mobile station.

Referring to FIG. 1, a wireless communication system 100 is illustrated to include a base station (BS) 110 that may start transmission to at least one mobile station (MS) 115 after an additional delay, i.e., in a subsequent period instead of a typical delay of only a half slot according to one illustrative embodiment of the present invention. The additional delay may expand radius of a cell for a wireless communication between the base station 110 and the mobile station 115.

The base station 110 may be associated with a high-speed wireless data network to provide the wireless connectivity to the mobile station 115 according to any desirable protocol. Examples of such a protocol include a Code Division Multiple Access (CDMA, cdma2000) protocol, an Evolved Data Optimized (EVDO, 1XEVDO) protocol, a Universal Mobile Telecommunication System (UMTS) protocol, a Global System for Mobile communications (GSM) protocol, and the like.

Examples of the mobile station 115 may include a host of wireless communication devices including, but not limited to, cellular telephones, personal digital assistants (PDAs), and global positioning systems (GPS) that employ the wireless communication system 100 to operate in a high-speed wireless data network. Other examples of the mobile station 115 may include smart phones, text messaging devices, and the like.

Consistent with one embodiment, the mobile station 115 may transmit messages to the base station 110 over a reverse link 120. In the wireless communication system 100, a wireless communication between the base station 110 and the mobile station 115 may occur over an air interface 135 via a radio frequency (RF) medium that may use a code division multiple access (CDMA) protocol to support multiple users. A forward link 140 may provide messages to the mobile station 115. The messages may include traffic packets and signaling messages.

The base station 110 may receive data rate requests, such as a request 148 over the reverse link 120 a reverse link channel, such as in a data request channel (DRC) 150 for the purposes of starting transmission on the forward link 140. The mobile station 115 may send the request 148 for a data rate to efficiently utilize the bandwidth available on the forward link 140. The request 148 may indicate an estimate for the data rate that the mobile station 115 may be able to receive data from the base station 110 over the forward link 140. For example, the mobile station 115 may indicate a data rate of 2.4 megabits per second, 1.8 megabits per second, and the like.

In response to the request 148, the base station 110 may begin a forward link transmission 155 after a delay of at least one slot longer than a typical half slot delay. That is, the base station 110 may initiate transmission on the forward link 140 during a next period of a number of slots associated with the data request channel (DRC) 150 length. Examples of the number of slots associated with the DRC length include 1, 2, 4, or 8 configurable slots in the wireless communication system 100 depending upon a desirable application.

For example, in an EVDO compliant wireless communication system, the mobile station 115 may send the request 148 in a slot of duration, such as 1.67 milliseconds. The mobile station 115 may send the request 148 to indicate a data rate that the base station 110 may use for the forward link transmission 155 to send a user data packet to the mobile station 115. The forward link transmission 155 may include traffic packets and signaling messages based on the CDMA2000 1xEV-DO specification, which uses a frequency band with channel bandwidth (1.23 MHz) and chip rate (1.2288 Mcps). In CDMA2000 1xEV-DO, for example, each forward link frame is 26.666 msec and consists of 16 slots. Like the forward link frame, the reverse link frame is 26.666 msec and consists of 16 slots.

By using the data rate indicated by the request 148 for the forward transmission link 155, the base station 110 may communicate with the mobile station 115. To this end, the base station 110 may comprise a receive (RX) antenna 160*a* and a transmit (TX) antenna 160*b*. The base station 110 may further comprise an antenna connector 165 to couple the receive antenna 160*a* and the transmit antenna 160*b* to a radio 170. The radio 170, in one embodiment, may include a reverse link (RL) modem 175(1) and a forward link (FL) modem 175(2).

The FL modem 175(2) may allocate one or more transmission or signaling resources for the forward link transmission 155. Examples of the signaling or transmission resources include a number of time slots or a number of frequency sub-bands or a number of spatial dimensions allocated to a particular transmission mode. To this end, the FL modem 175(2) may use the time slots for the forward link transmission 155 to the mobile station 115. The RL modem 175(1) may process the transmissions on the reverse link 120. In particular, the RL modem 175(1) may process the time slots on the reverse link 120.

To schedule the forward link transmission 155, the base station 110 may further comprise a software (SW) module 180 that may determine a cell size, i.e., the radius of a cell. In one embodiment, the cell size refers to an air time delay available to the base station 110 to transmit data to the mobile station 115 at a desired data rate indicated by the mobile station 115 in a previous period of a DRC length. The software module 180 may enable an additional delay of at least one slot beyond a typical half slot delay available to the base station 110, increasing range of a cell size or expanding the cell radius.

In particular, the base station 110 may communicate with the mobile station 115 within a cell 185. However, by gaining another slot of delay, the base station 110 may skip a slot immediately after the half slot on the forward link transmission 155. In this way, the cell size 185 may increase to a larger cell 190, expanding a cell radius 195. As used herein, the term "the cell radius 195" refers to increase in availability of one or more radio resources, such as radio frequency (RF) resources, that may be used to form a cell as well as the various features that may be provided to the mobile station 115 by the base station 110. For example, the software module 180 may enable the mobile station 115 to transmit at a relatively longer distance.

In other words, the software module 180 enables transmission with a larger delay available to increase or provide an extended range for the larger cell 190. That is, in one embodiment of the present invention, the software module 180 may provide an additional delay of at least one slot over a typically available delay of a half slot so that the base station 110 may schedule the forward link transmission 155 to the mobile station 115 to start transmission on a next slot. By providing this additional delay of at least one slot, the cell 185 may expand in radius to the larger cell 190 since an additional one slot becomes available for one or more functions including decoding of a wireless communication.

Consistent with one embodiment of the present invention, the software module 180 may control the reverse link modem 175(1) and the forward link modem 175(2) to skip a slot immediately after a half slot delay in the forward link transmission 155. By skipping a slot after the half slot delay, the radio 170 at the base station 110 may increase the interface delay over the air interface 135 since the forward link transmission 155 and the DRC transmission 150 on the reverse link 120 may be now one and a half slot apart.

Figure 2:
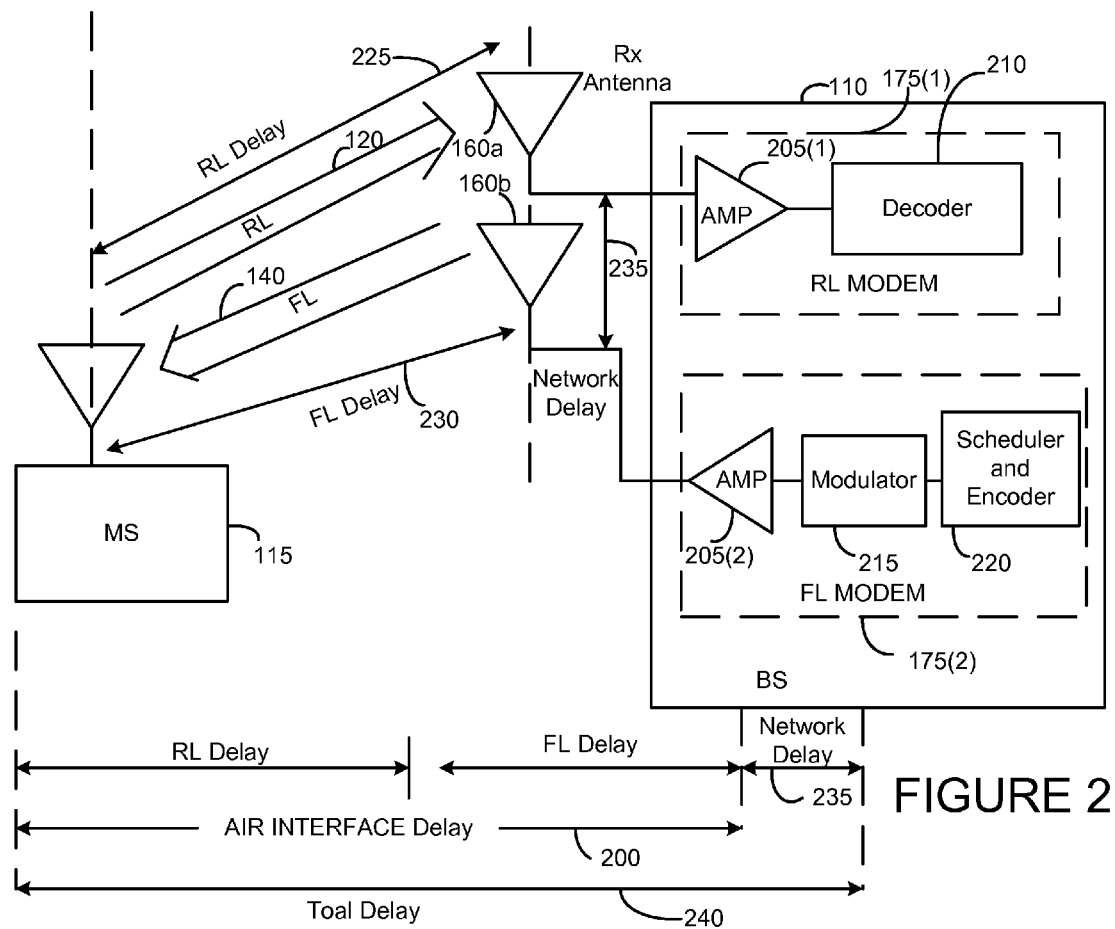
FIG. 2 schematically depicts various delays associated with the wireless communication shown in FIG. 1 in accordance with one illustrative embodiment of the present invention.

Referring to FIG. 2, various delays associated with the wireless communication in the wireless communication system 100 between the base station 110 and the mobile station 115 have been illustrated according to one embodiment. For example, in a high-speed wireless data network such various delays may include an interface delay 200 which defines an expansion range for the cell radius 195 in accordance with one embodiment of the present invention.

In one embodiment, the reverse link modem 175(1) at the base station 110 may comprise an amplifier (AMP) 205(1) coupled to a decoder 210. The decoder 210 may decode the request 148 from the data request channel 150 on the reverse link 120. The amplifier 205(1) may amplify a signal received over the receive antenna 160*a*. Likewise, the forward link modem 175(2) may comprise an amplifier 205(2) coupled to a modulator 215, in turn, coupled to a scheduler and/or encoder 220. The scheduler and/or encoder 220 may encode the user data packet to be transmitted to the mobile station 115 from the base station 110 before for the modulator 215 modulates the user data packet. The amplifier 205(2) may amplify the modulated data packet for transmission via the transmit antenna 160*b* over the forward link 140.

In operation, the base station 110 may consume time to decode the request 148 in the data request channel 150 using the decoder 210. However, a delay may occur on the reverse link 120 in sending a DRC value from the reverse link modem 175(1) to the forward link modem 175(2). In other words, a reverse link (RL) delay 225 and a forward link (FL) delay 230 may occur for the request 148 to be met. In addition, a network delay 235 occurs from the receive antenna 160*a* and the transmit antenna 160*b*. While the reverse link delay 225 and the forward link delay 230 indicate the air interface delay 200, the network delay 235 includes a delay associated with scheduling a user among the active users in a sector, encoding the user data packet on the forward link transmission 155 for the selected user, a transmission delay present within the base station 110 from the radio 170 to the antenna connector 165. The air interface delay 200 indicates the cell radius 195 based on a total delay budget 240 without the network delay 235.

However, persons of ordinary skill in the art having benefit of the present disclosure should appreciate that the present invention is not limited to expansion of the cell radius 195. In alternative embodiments, the software module 180 may enable the base station 110 to provide different capabilities and/or additional capabilities to enhance the range of the wireless communication between the base station 110 and the mobile station 115.

According to one embodiment, the mobile station 115 may transmit messages or signals to one or more active base stations using one or more associated reverse links. Pseudo noise offsets (PN offsets) associated with each of the active base stations are included in an active set list, which is typically stored by a radio network controller typically coupled to the base station 110. The mobile station 115 may receive messages and/or signals over the forward link 140 from one of the active base stations, which is generally referred to as the serving base station or the serving sector. The 3rd Generation Partnership Project (3GPP) standard defines the role of a serving radio network controller based on 3GPP specifications.

Besides the messages or signals, the mobile station 115 may receive traffic packets, such as data packets. Often the traffic packets include information that is intended for the user of the mobile station 115. For example, traffic packets may include voice information, images, video, data requested from an Internet site, and the like. In contrast, signaling messages are used to provide information intended to be used by the mobile station 115 and/or other elements of the wireless communication system 100. Specifically, signaling messages may include configuration messages, setup instructions, switch instructions, handoff instructions, and the like.

Figure 4:
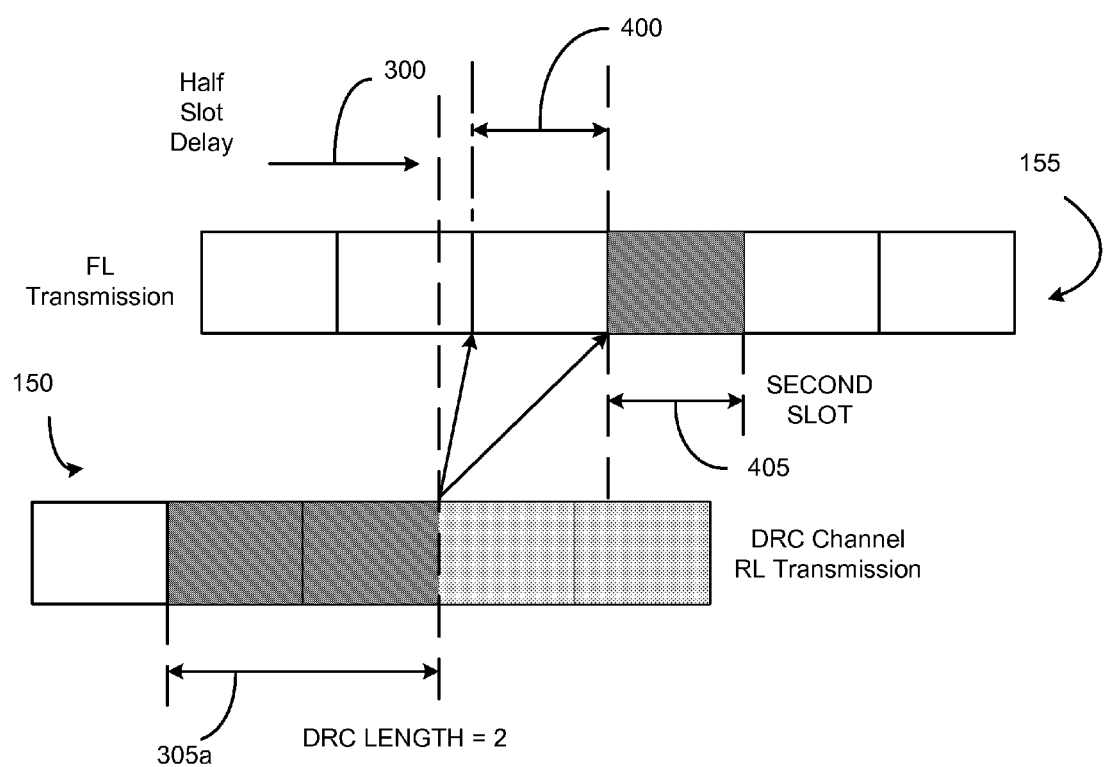
FIG. 4 illustrates a stylized representation of a forward link transmission and a reverse link transmission of a data rate control channel in accordance with one illustrative embodiment of the present invention.

Referring to FIG. 4, the forward link transmission 155 and a reverse link transmission of the data rate control 150 channel is shown in accordance with one illustrative embodiment of the present invention the forward link transmission 155 may start after a delay of an additional slot, such as a first slot 400. In other words, the base station 110 may skip the first slot 400 before starting the forward link transmission 155 after a half slot 300 delay. The half slot 300 delay after a DRC length of 2 is indicated in the DRC channel 150 transmission. By skipping the first slot 400, the base station 110 may start transmission to the mobile station 115 on the forward link 120 at the beginning of a second slot 405. In this way, the base station 110 may increase the cell radius 195 of an existing cell, such as the cell 185 to the larger cell 190.

Figure 3:
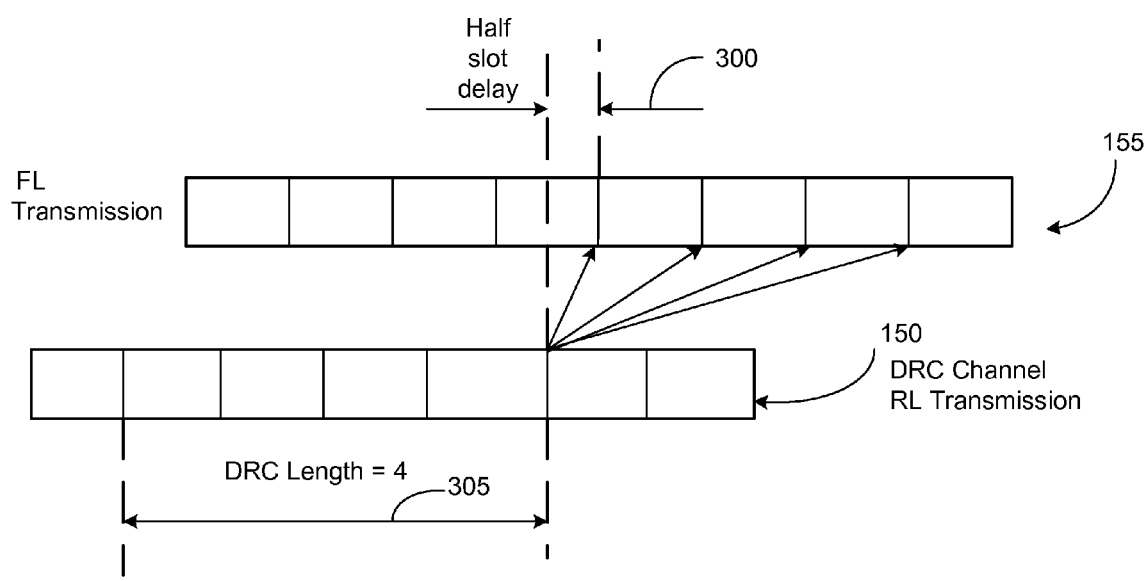
FIG. 3 illustrates a stylized representation of a conventional forward link transmission and a reverse link transmission of a data rate control channel.

In other words, even though the EVDO standard restricts that the base station 110 may decode the DRC 150 only at the end of the DRC length 305 slot(s), limiting the cell radius 195 of the cell 185 the larger cell 190 having the cell radius 195 may be supported by the forward link transmission 155 and the transmission of the DRC channel 150 on the reverse link 120, as shown in FIG. 3 consistent with the EVDO standard requirements.

Figure 5:
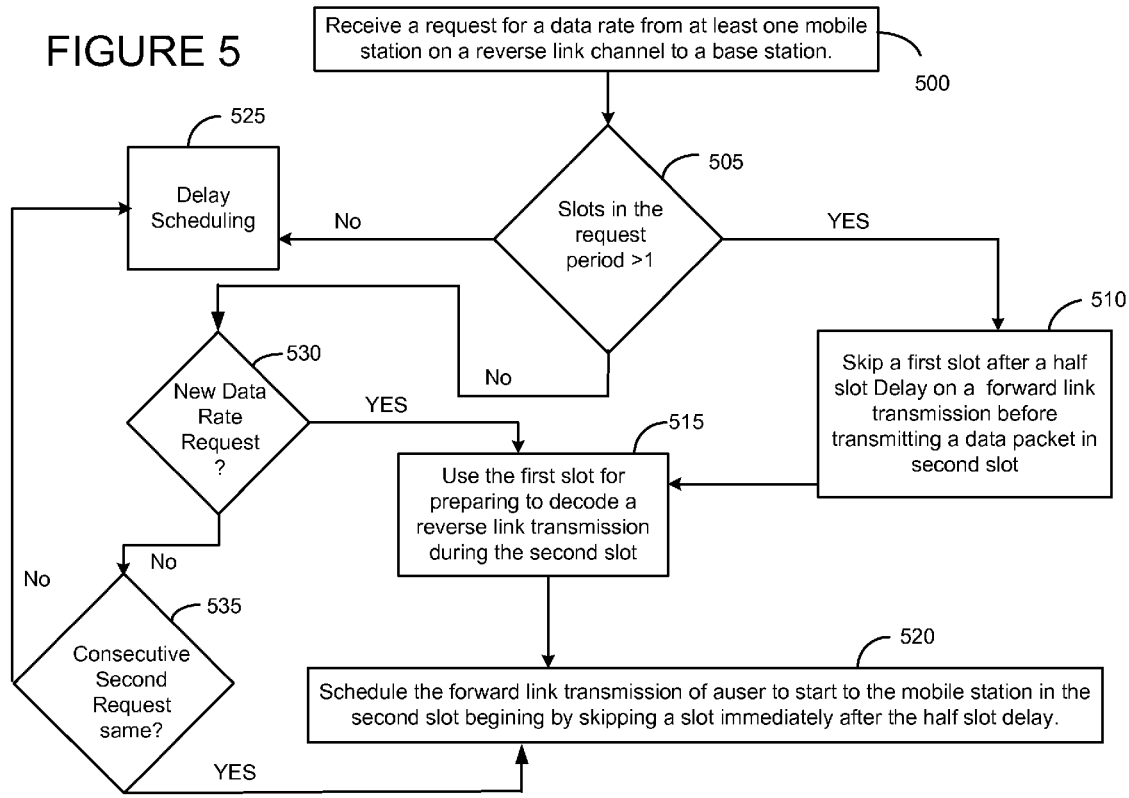
FIG. 5 depicts a stylized representation for implementing a method of scheduling the forward link transmission of a user to the mobile station in a particular slot consistent with one exemplary embodiment of the present invention.

Turning now to FIG. 5, scheduling of the forward link transmission 155 of a user to the mobile station 115 is illustrated in a particular slot consistent with one exemplary embodiment of the present invention. The base station 110 may receive the request 148 for a data rate from the mobile station 115 on a reverse link channel, such as the data request channel (DRC) 150 in transmission over the reverse link (RL) 120, as indicated in block 500.

The software module 180 may determine whether the number of slots in a request period, i.e., the DRC length is >1 at a decision block 505. To this end, the decoder 210 at the base station 110 may determine whether the DRC length 305 is such that the decoder 210 can determine a DRC value after one or more slots. If so, the decoder 210 may indicate to the software module 180 that the first slot 140 may be skipped. In this way, at block 510, the software module 180 may skip the first slot 140 after the half slot 300 delay on the forward link transmission 155 before transmitting a data packet in the second slot 405, as shown in FIG. 4.

However, the first slot 140 may be used for preparing to decode a reverse link transmission during the second slot 405, as shown in block 515. The scheduler and/or encoder 220 at the base station 110 may schedule the forward link transmission 155 of a user to start to the mobile station 115 in the second slot 405. By beginning the forward link transmission 155 at the start of the second slot 405, the software module 180 may cause the base station 110 to skip a slot immediately after the half slot 300 delay as shown in block 520.

When at the decision block 505 the software module 180 determines that the number of slots in the request period is >1, the base station 110 may delay the scheduling of the forward link transmission 155 by the scheduler 220 and/or encoder 220, as shown in block 525. Another decision block 530 may indicate whether the request 148 is a request for a new data rate. If the request 148 is for a new data rate, the method transitions to the block 515.

Alternatively, if the request 148 is indicated to be a request, which has been previously received for a data rate at the base station 110 from the mobile station 115, a decision block 535 determines whether a second time request is same as the preceding a first time request for a data rate. If the two consecutive requests are the same, the software module 180 may cause the scheduler 220 at the base station 110 to schedule the forward link transmission 155 to start at the beginning of the second slot 405. Conversely, if the consecutive second request is not the same as the earlier request for a data rate at the decision block 535, the software module 180 may delay the scheduling, as indicated in block 525.

Figure 6:
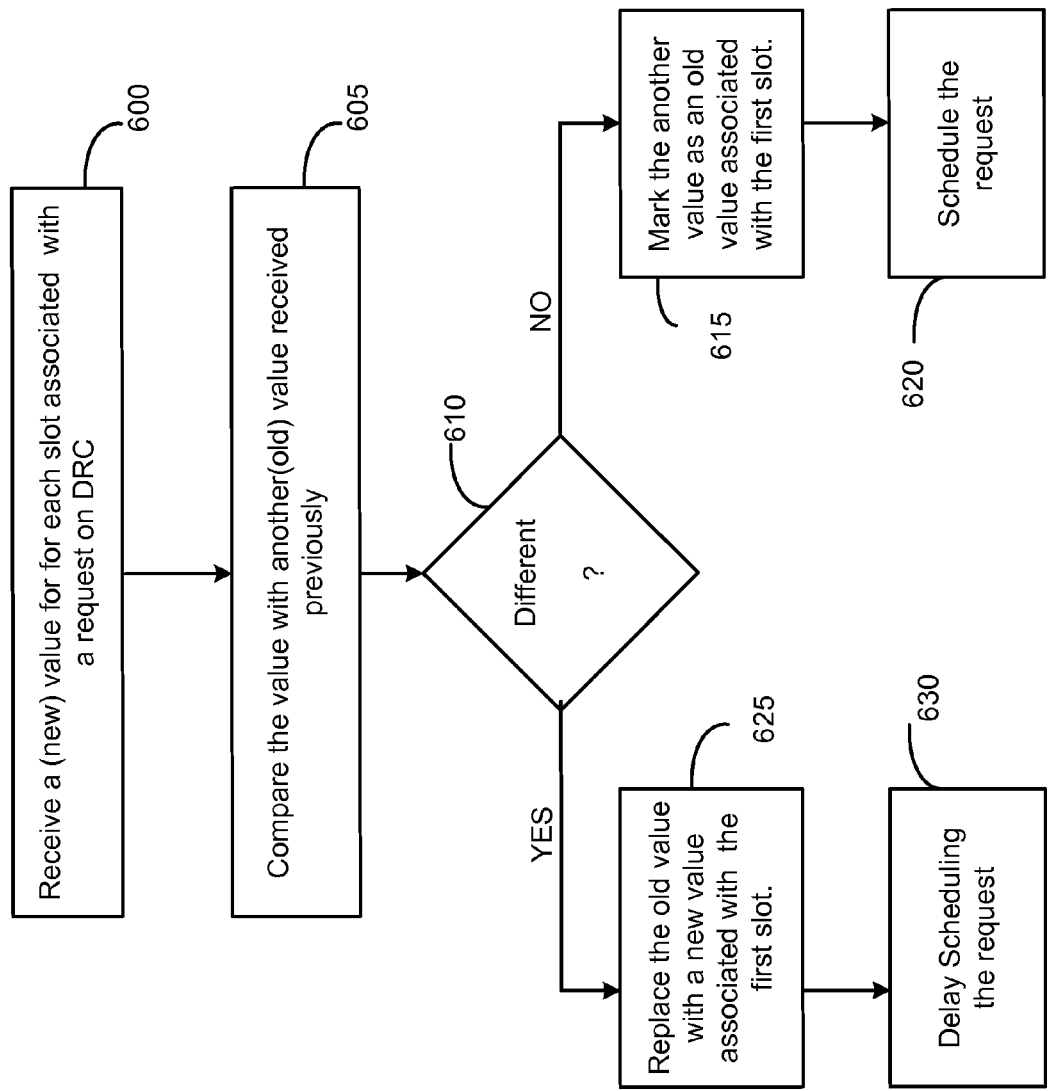
FIG. 6 illustrates a stylized representation for implementing a method of scheduling a request for a data rate on a reverse link channel from the mobile station to the base station shown in FIG. 1 in accordance with one embodiment of the present invention.

Referring to FIG. 6, scheduling the request 148 for a data rate on a reverse link channel from the mobile station 115 to the base station 110 shown in FIG. 1 is illustrated in accordance with one embodiment of the present invention. The software module 180 may receive a value, such as a new value for each slot associated with the request 148 on the data request channel (DRC) 150, at block 600. The software module 180 may compare the new value with another value, such as an old value received previously for a data rate by the base station 110 from the mobile station 115, as indicated in block 605.

A decision block 610 may ascertain whether the old value and the new value of the data rate are different. If the two values are indicated to not be the same at the decision block 610, the software module 180 may mark another value as an old value associated with the first slot 400, as shown in block 615. At block 620, the software module 180 may cause the scheduler 220 to schedule the request 148.

However, if at the decision block 610, the software module 180 determines that the new value is different than the old value, which has been received previously, the software module 180 may replace the old value with a new value associated with the first slot 400, at block 625. After replacing the values, the software module 180 may delay the scheduling of the request 148, as block 630. In this way, the base station 110 may obtain data rates for the forward link transmission 155 based on the feedback on the reverse link 140 from the mobile station 115.

In one embodiment, a high-speed wireless data network may wirelessly communicate mobile data at a speed and coverage desired by individual users or enterprises. According to one embodiment, the high-speed wireless data network may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS also referred as Wideband Code Division Multiple Access (WCDMA) includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of wireless communication between a base station and at least one mobile station, the method comprising:

receiving a request for a data rate from said at least one mobile station on a reverse link channel to said base station; and in response to said request, skipping a first slot after a delay for a portion of a slot on a forward link transmission before transmitting a data packet in a second slot, wherein skipping the first slot comprises:

determining if a current value of said data rate request differs from a previous value of a previously received data rate request;

marking the current value as a new value for the first slot of the forward link transmission; and delaying scheduling said request until after the first slot.

2. A method, as set forth in claim 1, wherein said skipping a first slot further comprises:

skipping a slot immediately after a half slot delay.

3. A method, as set forth in claim 2, wherein said skipping said first slot further comprises:
receiving the current value associated with said request in at least one slot of a data rate channel;
comparing the current value to the previous value received for said first slot on a reverse link transmission; and
determining whether the current value is different than the previous value.

4. A method, as set forth in claim 3, further comprising:
if the current value is different than the previous value, causing a decoder of a modem for a reverse link to indicate a new value associated with said first slot.

5. A method, as set forth in claim 3, further comprising:
if the current value is determined not to be the same as the previous value, replacing the previous value with the current value; and
marking the current value as a new value for said first slot.

6. A method, as set forth in claim 3, further comprising:
if said value is determined to be the same as said another value that is received previously, making said another value as an old value associated with said first slot; and
scheduling said request.

7. A method, as set forth in claim 3, further comprising:
adding a delay of said first slot to increase a range of a cell; and
using said delay to support a cell configuration different than one based on said half slot delay.

8. A method, as set forth in claim 1, further comprising:
using said first slot for preparing to decode a reverse link transmission during said second slot.

9. A method, as set forth in claim 1, further comprising:
using said first slot for preparing to start said forward link transmission at the beginning of said second slot.

10. A method, as set forth in claim 1, further comprising:
receiving said request on a data request channel from said at least one mobile station in at least two slots; and
scheduling a user in said second slot based on said request.

11. A method, as set forth in claim 10, further comprising:
determining whether said request on the data request channel is a new data request; and
if said request is a new data request, scheduling said forward link transmission to start at the beginning of said second slot to transmit said data packet to said at least one mobile station.

12. A method, as set forth in claim 11, further comprising:
decoding said new data request in said first slot.

13. A method, as set forth in claim 1, further comprising:
receiving said request of a length on a data request channel at said base station; and
determining the length of said request on said data request channel that said at least one mobile station is using.

14. A method, as set forth in claim 13, wherein determining the length of said request, further comprises:
if the length of said request is a single slot, delaying scheduling of a user in said second slot.

15. A method, as set forth in claim 14, further comprising:
in response to detecting a consecutive second request same as said request, scheduling said user.

* * * * *